(12) United States Patent
Hecht

(10) Patent No.: US 12,289,334 B2
(45) Date of Patent: Apr. 29, 2025

(54) ANALYZING AND ADDRESSING SECURITY THREATS IN NETWORK RESOURCES

(71) Applicant: CyberArk Software Ltd., Petach-Tikva (IL)

(72) Inventor: Asaf Hecht, Tel Aviv (IL)

(73) Assignee: CyberArk Software, Ltd., Petach-Tikva (IL)

( * ) Notice: Subject to any disclaimer, the term of this patent is extended or adjusted under 35 U.S.C. 154(b) by 431 days.

(21) Appl. No.: 17/724,563

(22) Filed: Apr. 20, 2022

(65) Prior Publication Data
US 2022/0247776 A1    Aug. 4, 2022

Related U.S. Application Data

(63) Continuation-in-part of application No. 16/719,464, filed on Dec. 18, 2019, now Pat. No. 11,323,470.

(51) Int. Cl.
   *H04L 9/40* (2022.01)
(52) U.S. Cl.
   CPC ........ *H04L 63/1433* (2013.01); *H04L 63/205* (2013.01)
(58) Field of Classification Search
   CPC ................ H04L 63/1433; H04L 63/205
   See application file for complete search history.

(56) References Cited

U.S. PATENT DOCUMENTS

| | | | |
|---|---|---|---|
| 8,554,912 B1 | 10/2013 | Reeves et al. | |
| 9,294,498 B1* | 3/2016 | Yampolskiy | ........... G06N 20/00 |
| 10,643,002 B1 | 5/2020 | Veselov et al. | |
| 11,082,442 B1* | 8/2021 | Kolman | .................. H04L 63/08 |
| 2013/0159049 A1 | 6/2013 | Arumugam et al. | |
| 2014/0137257 A1* | 5/2014 | Martinez | ............. H04L 63/1433 726/25 |
| 2014/0189865 A1 | 7/2014 | Abuelsaad et al. | |
| 2015/0220929 A1 | 8/2015 | Monk | |
| 2016/0171415 A1 | 6/2016 | Yampolskiy et al. | |
| 2017/0251276 A1 | 8/2017 | David | |

(Continued)

OTHER PUBLICATIONS

Hecht, Asaf, CyberArk Impact 2020; "The Cloud Shadow Admin Threat: 10 Permissions to Protect", pp. 1-19, https://www.cyberarkcom/threat-research-blog/cloud-shadow-admin-threat-10-permissions-protect/.

*Primary Examiner* — Henry Tsang
*Assistant Examiner* — Suman Debnath
(74) *Attorney, Agent, or Firm* — Finnegan, Henderson, Farabow, Garrett & Dunner LLP

(57) ABSTRACT

Disclosed embodiments relate to systems and methods for composite risk scores for network resources. Techniques include retrieving data associated with multiple network resources. The retrieved data is used to perform a first assessment for each of the multiple network resources to estimate a vulnerability level for each of the multiple network resources. The retrieved dated is also used to perform a second assessment for each of the multiple network resources to estimate an importance level for each of the multiple network resources. Based on a result of the first assessment and a result of the second assessment, a composite risk score for each of the multiple network resources is determined. When needed, a security response is performed based on the determined composite risk score of a specific network resource among the multiple network resources.

24 Claims, 9 Drawing Sheets

(56) References Cited

U.S. PATENT DOCUMENTS

| | | | |
|---|---|---|---|
| 2019/0081949 A1* | 3/2019 | Wu | G06F 21/554 |
| 2019/0089725 A1 | 3/2019 | Anachi | |
| 2019/0327271 A1* | 10/2019 | Saxena | G06F 8/38 |
| 2020/0382546 A1* | 12/2020 | Henderson | G06F 40/177 |
| 2021/0084040 A1* | 3/2021 | Sakowicz | H04L 63/1425 |
| 2021/0142209 A1 | 5/2021 | Patil et al. | |
| 2023/0009116 A1* | 1/2023 | Berger | H04L 63/1433 |

* cited by examiner

ANALYZING AND ADDRESSING SECURITY THREATS IN NETWORK RESOURCES

CROSS-REFERENCE TO RELATED APPLICATIONS

This application is a continuation-in-part of U.S. application Ser. No. 16/719,464, filed on Dec. 18, 2019, the disclosure of which is expressly incorporated herein by reference in its entirety.

BACKGROUND

Today's computing systems and networks use a wide variety of permissions to grant users access to restricted resources. While they are an important part of many modern computing environments, permissions that are not properly managed can present significant security risks. Each additional privilege (or privilege level, or duration of privileges) presents another channel through which an attacker may gain unauthorized access to target a system, computer, application, or other resource. Ideally, a system would provide only those permissions that are necessary for it to function properly, and no more, because unused permissions unnecessarily increase the risk and severity of attacks.

The high number and large variety of types of permissions pose a unique challenge to addressing these risks. Not all unused permissions present the same level of risk for attacks. For example, some permissions may give users a greater scope of access, or access to more sensitive resources, thus increasing the potential damage that could be achieved by a malicious attacker. These problems are compounded in modern virtualized (e.g., cloud-based) computing environments. In such environments, a variety of different types of applications may be utilized, each having its own rules or policies for using privileges. Similar problems exist in modern on-premises networks, IoT networks, and other types of complex networks.

Accordingly, solutions are needed to identify unused permissions and assess their damage potential so that unused permissions may be addressed in an efficient and effective manner. It would be advantageous for such solutions to assess the damage potential using a normalized score to permit meaningful comparisons between different types of permissions. Solutions should also permit such scores to be calculated for individual permissions, groups of permissions associated with an entity, or groups of entities present within a specific environment. Score comparisons should enable the system to prioritize between permissions, entities, or environments and to identify the highest risk factors so they may be addressed on a prioritized basis.

Additionally, an organization may have thousands of resources and may have difficulty to effectively prioritize the measures used to keep these resources safe. Accordingly, solutions are needed to assess and compare the vulnerability and the importance of the organization's resources. It would be advantageous for such solutions to assess the risk of resources using a normalized quantitative score to permit meaningful comparisons between resources. Score comparisons should enable the system to prioritize between resources and to identify the highest risk or most important resources so they may be addressed on a prioritized basis. Solutions should also enable organizations to compare any current prioritizations with past prioritization based on the normalized scores and identify the differences for effective remediation.

SUMMARY

The disclosed embodiments describe non-transitory computer readable media, systems, and methods for developing composite threat scores for network resources. For example, in an exemplary embodiment, there may be a non-transitory computer readable medium including instructions that, when executed by at least one processor, cause the at least one processor to perform operations for developing composite risk scores for network resources. The operations may comprise retrieving data associated with multiple network resources; using the retrieved data to perform a first assessment for each of the multiple network resources to estimate a vulnerability level for each of the multiple network resources; using the retrieved data to perform a second assessment for each of the multiple network resources to estimate an importance level for each of the multiple network resources; based on a result of the first assessment and a result of the second assessment, determining a composite risk score for each of the multiple network resources; and performing a security response based on the determined composite risk score of a specific network resource among the multiple network resources.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
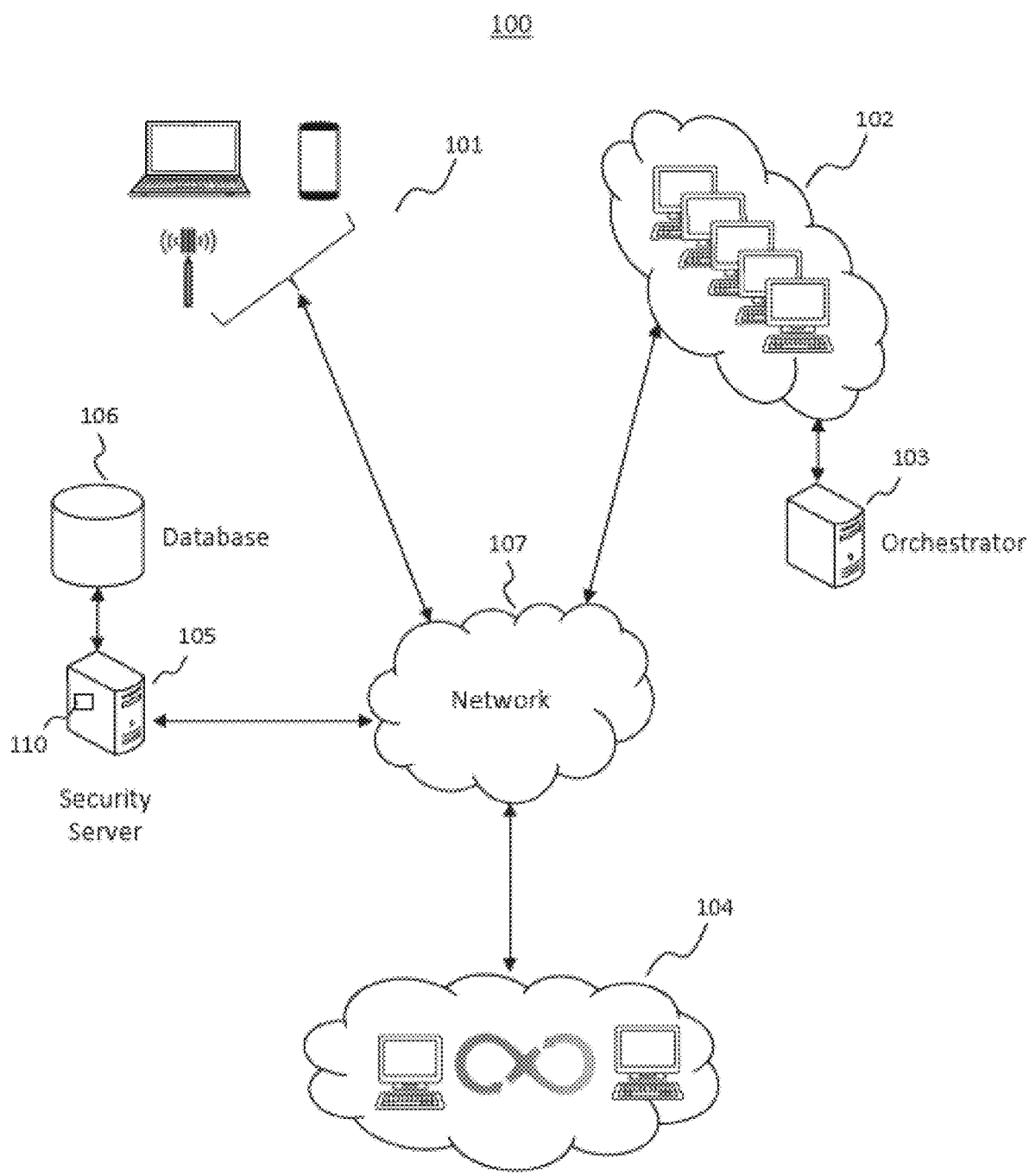
FIG. 1 is a block diagram of an exemplary system for analyzing and addressing least-privilege security threats on a composite basis, consistent with embodiments of the present disclosure.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

In accordance with disclosed techniques, a system may have multiple users, applications, or other types of identities attempting to access a secure resource, such as a cloud computing resource. As discussed further below, an identity may be a user account, machine account, application account, virtual computing resource instance, serverless code instance, or any other type of account that may be associated with a particular user, machine, or application in a computer network. An identity may also be used to gain access to resources of a local machine or computing device, such as a locally installed application or remote desktop. An identity may access the resource using a client computing device, virtual computing instance, or other type of computing resource. In order to grant access to the identity, the resource or another part of the computing system may require authorization and/or authentication of the identity.

Such identities may have different levels of access rights associated with them, ranging from broad access rights (e.g., administrator or root-level privileges) across several platforms to very narrow access rights (e.g., network guest, or temporary accounts). Many identities with broad access rights may be labeled as administrator accounts. Such administrator accounts may be listed in an active directory group (e.g., Microsoft Active Directory™, AWS Managed Microsoft AD™, JumpCloud™ directory, or others) to more easily monitor the accounts with the greatest permissions.

However, "shadow network administrators" also known as "shadow admins" may be created through direct assignment of sensitive privileges, either alone or in combination. Shadow network administrators may present unique threats to systems because they are not included in the admins directory and are thus harder to identify and track. Further, such shadow network administrators may not be subject to the same security controls as standard administrators with full access. For example, an identity may have a permission allowing it to create an access key for other accounts. A malicious user with access to this identity could then create a new access key for an administrator account, access the administrator account using the newly generated access key, and then carry out attacks using the administrator account's other sensitive permissions. Thus, any identity having the permission to create an access key may, in some circumstances, need to be subject to the same security protocols as full-access administrative accounts.

Modern computing environments often include numerous different identities. Some or all such identities may be dispersed among on-premises and/or virtualized (e.g., cloud-based) network environments. As the number of active permissions in an environment grows, however, this often leads to a greater attack surface for malicious users and thus a greater potential that a malicious user can cause damage to the environment. It can therefore be advantageous to limit the total number of permissions in any given environment. Ideally, the only permissions existing within the environment would be those that are actively used or required, and such permissions would be monitored according to the potential security threat that they pose. A permission that is not used (e.g., unused to its full scope, unused for a period of time, etc.) presents an unnecessary threat that offers no value to the environment.

In the disclosed embodiments, techniques of analyzing and addressing least-privilege security threats on a composite basis are described. In some embodiments, a least-privilege damage score may be calculated that quantifies the threat that an unused permission poses to a secure entity or environment. In other embodiments, scores for individual permissions may be aggregated to calculate a score for the entity. In further embodiments, scores for multiple entities may be aggregated into a single score for a specific environment. In some embodiments, changes to the permissions or environment may be made based upon the one or more scores.

Disclosed embodiments enable an identity (e.g., application, service, user, etc.) to access and execute functions on a remote resource securely, with least-privileges (i.e., a minimal scope of needed privileges, and/or a minimal duration of privileges). Further, disclosed systems are compatible with protocols enabling remote sessions, e.g., RDP, and HTML5 solutions, as well as protocols supporting tunneling to a remote machine, e.g., SSH port forwarding. Over RDP, for example, the system may use clients such as RD-desktop, Terminal Server Client (TS client), VirtualBox Remote Display Protocol (VRDP)™, Free RDP, or any other RDP client. Alternatively, process execution may be facilitated by an application enabling a remote desktop, e.g., Remote Desktop by Google Chrome™, TeamViewer™, LogmeIn™, or Citrix™, as well as other remote access services. For example, if LogmeIn™ is already installed on the target resource, it may be used to connect to the target resource transparently and perform automatic remote process execution.

Further, in other embodiments, the system may enable an identity to access a group of target resources, e.g., to execute code and/or automated processes on the group of target resources, or to perform other actions. For example, the system may invoke automated execution on a plurality of defined target applications or machines. This may be useful in situations where a common task needs to be performed for a group of resources (e.g., a software update, patch installation, data provisioning, etc.). An identity may also be able to enable automated remote process execution on one or a group of target resources. For example, a user may execute automatic upgrades to existing applications on a target resource; retrieve data from the resource; access files, data, or applications residing on the resource; retrieve metrics stored by or associated with the resource; perform one-time or regular maintenance on the resource; perform and/or schedule a job to execute periodically on the resource; retrieve keystrokes and/or window titles associated with a remote session, without requiring administrator privileges on the resource; and perform various other operations.

In some embodiments, the system may identify a prompt from a client computing device associated with an identity requesting access to a target resource. As disclosed below, a computer device may be any of numerous types of devices with data processing and network communications capabilities. Examples include servers, desktop computers, cloud-computing virtual machines or containers, laptops, smart-phones, tablets, personal digital assistants, enterprise digital assistants, smart cards, smart watches, smart bands, smart headphones, computer-embedded clothing, car-computers and other in-vehicle computer equipment, Internet-of- Things (IoT) devices, and any other device with data processing and network connectivity capabilities.

Disclosed embodiments may involve developing composite risk scores for network resources. The term "network resource" may refer to any type of computing resource that may be accessible by entities (e.g., users, machines, applications) via a communications network. Some examples of network resources may include physical network devices, such as routers, switches, cards, ports, cables, and ducts, etc. Other examples of network resources may include files, folders, files in cloud buckets, serverless function settings, databases, logs, computer programs, computer codes, machine executable instructions, and any other type of data that may be stored in a data structure.

A communications network that may be used to access network resources may include any type of physical or wireless computer networking arrangement used to exchange data. For example, a communications network may be the Internet, a private data network, a virtual private network using a public network, a Wi-Fi network, a LAN or WAN network, a combination of one or more of the forgoing, and/or other suitable connections that may enable information exchange among various components of the system. In some embodiments, a communications network may include one or more physical links used to exchange data, such as Ethernet, coaxial cables, twisted pair cables, fiber optics, or any other suitable physical medium for exchanging data. A communications network may also include a public switched telephone network ("PSTN") and/or a wireless cellular network. A communications network may be a secured network or unsecured network. In other embodiments, one or more components of the disclosed system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

A data structure that may be used to store network resources may include any collection of data values and relationships among them. Specifically, the network resource may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling accessing the network resource. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB™, Redis™, Couchbase™, Datastax Enterprise Graph™, Elastic Search™, Splunk™, SoIr™, Cassandra™, Amazon DynamoDB™, Scylla™, HBase™, and Neo4J™. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures.

Reference will now be made in detail to the disclosed embodiments, examples of which are illustrated in the accompanying drawings.

FIG. 1 is a block diagram of an exemplary system for analyzing and addressing least-privilege security threats on a composite basis. System 100 may include client device 101, cloud computing environment 102, cloud orchestrator 103, DevOps environment 104, security server 105, database 106, and network 107 as shown in FIG. 1. Exemplary implementations of these components are discussed below. While FIG. 1 includes particular numbers or arrangements of these components, in various embodiments the number, arrangement, and presence of such components may vary.

Client devices 101 may include a variety of types of devices, including those capable of communication over a network. As illustrated, client devices 101 may be one or more of a personal computer (e.g., a desktop or laptop), an IoT device (e.g., sensor, smart home appliance, printer, connected vehicle, industrial device, etc.), or a handheld device (e.g., a mobile phone, a tablet, notebook, digital camera, etc.). Client device 101 may also be a vehicle-based or aircraft-based computer, a virtual machine (e.g., virtualized computer, container instance, etc.), a wearable device (e.g., a smart watch, smart jewelry, an implantable device, a fitness tracker, smart clothing, a head-mounted display, etc.), or various other devices capable of processing and/or receiving data. Client devices 101 may also be a server or other network connected computing resource.

In accordance with disclosed embodiments, client devices 101 may be associated with one or more identity. An identity may access, or attempt to access, resources distributed in a computer network and, additionally or alternatively, one or more resources of a local machine or computing device, such as a locally installed application, for example. The identity may also have a number of permissions associated with it that, once authenticated, give the identity access to restricted resources or grant the identity the ability to execute code on the resource, etc.

As described herein, in some embodiments, identities, computer devices, or users may be authenticated before access to and/or control of a target resource is granted or before an identity can cause the target resource to execute code. Authentication may broadly take several forms, such as verification of passwords, SSH keys, asymmetric (e.g., public/private) keys, symmetric keys, Kerberos tickets, Docker signed tags, and other types of cryptographic data or privileged security or access tokens. Further, the authentication may be based on white/black lists for identities or device addresses, or biometric or behavioral information, such as fingerprints, retinal scans, x-rays, biosensors, voice recognition, body movements, walking pace or rhythm, sitting characteristics or patterns, key stroke analysis, and more. In accordance with the disclosed embodiments, the authentication may be single-factor or multi-factor (i.e., a combination of any of the foregoing forms of authentication). Further, as discussed below, the authentication may be performed on the computer device 101, on a remote authentication server (e.g., security server 105), or through a combination of functionality of both.

Cloud computing environment 102 may include one or more virtual machines, which may be based on virtualization tools provided by Amazon Web Services™ (AWS), Microsoft Azure™, IBM Cloud™, Google Cloud Platform™, Cisco Metapod™, Joyent™, vmWare™, or others.

Cloud computing environment 102 may include various computing resources, storage resources, security services, developer tools, analytics tools, etc. that may be accessed by client device 101. As an example, AWS™ provides many varying cloud services including searching/analytics (e.g., CloudSearch™), virtual servers (e.g., EC2™), media services (e.g., MediaConvert™) database services (e.g., Aurora™), storage (e.g., S3™), and others. Cloud computing environment 102 may include various entities, machines, or services that include various permissions. Cloud computing environment 102 may be in communication with cloud orchestrator 103. Orchestrator 103 communicates with the different entities or components of cloud computing environment 102 to configure and deploy cloud computing services. In various embodiments, orchestrator 103 may be based on platforms such as AppFormix™, BMC Cloud LifeCycle Management™, IBM Cloud Orchestrator™, AWS CloudFormation™, Kubernetes™, or others.

Client device 101 may communicate with cloud computing environment 102 over a network 107. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, network 107 may be a cloud network, (e.g., private cloud, public cloud, or hybrid cloud network), or a combination of these types of networks. In some embodiments, the communications may take place across two or more of these forms of networks and protocols.

DevOps environment 104 may also be in communication with other components of system 100 through network 107. DevOps environment 104 may implement a DevOps, continuous development, or continuous deployment process. In some embodiments, DevOps or similar processes may be implemented in DevOps environment 104 to continuously develop or deploy new code to configure, update, or replace services or virtual machines within cloud computing environment 102. DevOps environment 104 may include one or more computers, servers, and storage resources used to implement DevOps processes. In some embodiments, new virtual instances within cloud computing environment 104 may be configured or updated through DevOps environment 104 before they are deployed. In various embodiments, DevOps environment 104 may be based on platforms such as Chef™, Puppet™, Ansible™, Splunk™, or others.

System 100 may also comprise one or more security servers 105 in communication with network 107. Security server 105 may perform authentication and/or authorization for various components of system 100. Further, security server 105 may perform the techniques described below in connection with FIGS. 2-5. In an example implementation, security server 105 may be in communication with a client device 101 and cloud computing environment 102 such that security server 105 may grant access to a cloud computing service in cloud computing environment 102 when requested by an identity associated with a user of client device 101. In some embodiments, security server 105 may authenticate and/or authorize the identity for such access. Security server 105 may also manage and store permissions for identities associated with client devices 101. For example, permissions and credentials may be stored using platforms such as CyberArk's Privileged Access Security™, Centrify's Privileged Access Service™, IBM's Security Privileged Identity Manager™, AWS's Identity and Access Management™, Azure's Active Directory Privileged Identity Management™, or various others. Security server 105 may also communicate with database 106. Database 106 may comprise a single database, multiple databases, cloud storage, or other data storage services. In some embodiments, database 106 may be storage local to or integrated with the security server 105. In other embodiments, database 106 may be separate or remote. Database 106 may store lists of permissions, lists or directories of identities, other information associated with identities, etc.

Security server 105 may include at least one processor 110. The term "at least one processor," may include any physical device or group of devices having electric circuitry that performs a logic operation on an input or on inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The term memory as used in this context and other contexts may include a Random Access Memory (RAM), a Read-Only Memory (ROM), a hard disk, an optical disk, a magnetic medium, a flash memory, other permanent, fixed, or volatile memory, or any other mechanism capable of storing instructions. Memory may include one or more separate storage devices collocated or disbursed, capable of storing data structures, instructions, or any other data. Memory may further include a memory portion containing instructions for the processor to execute. The memory may also be used as a working scratch pad for the processors or as a temporary storage.

In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively and may be co-located or located remotely from each other. The processors may be coupled electrically, magnetically, optically, acoustically, mechanically or by other means that permit them to interact.

Figure 2:
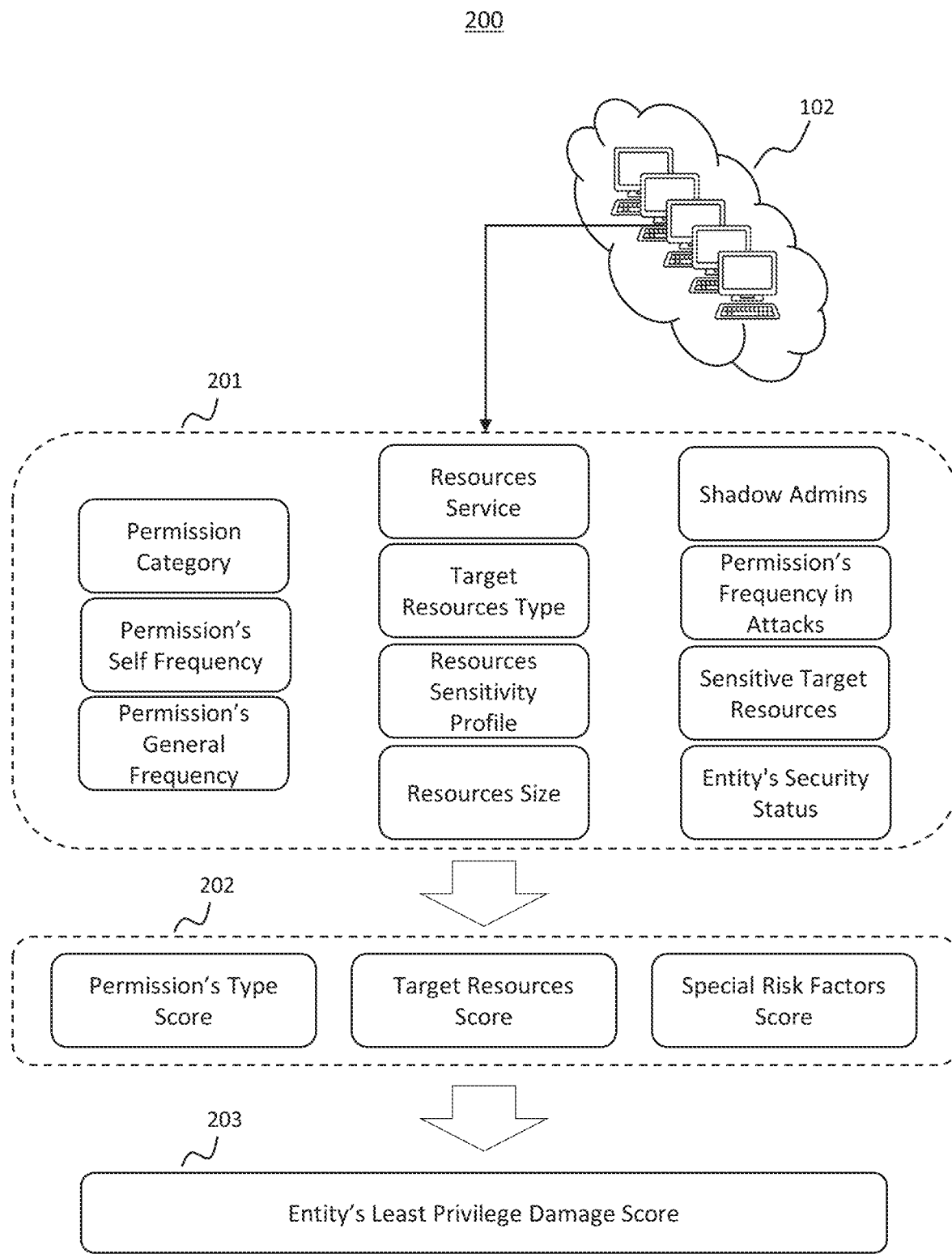
FIG. 2 is an illustration depicting the relationship between different types of least-privilege damage scores, consistent with embodiments of the present disclosure.

FIG. 2 is an illustration depicting the relationship between different levels of privilege damage scores, as discussed further below. A least-privilege damage score may be a normalized score that quantifies the extent of the security risk associated with specific permissions of an entity, for example a secure network resource, account, application, etc. The score may also correspond to the severity of the risk, the potential damage that could be caused by exploitation of the permission, the impact of a security breach using the permission, the urgency of making a change to address the potential risk of the permission, etc. As mentioned above, it may be desirable to limit the number of permissions that identities in an environment have to only the permissions that are actually needed for particular authorized functions, and no more (e.g., in scope or time). Reducing the number of unused permissions may reduce the number of potential avenues of attack for a malicious entity, without affecting legitimate operations in the environment. Thus, in some environments a least-privilege ratio can be calculated that compares the number of unused permissions to the number of total permissions. However, such a score does not take into account any potential differences between permissions. For example, an unused "delete" permission may present a greater risk to a system than an unused "read" permission because a malicious user could cause more harm by gaining access to the delete permission. A least-privilege damage score, as discussed below, may remedy this deficiency by addressing the amount of risk presented by a specific permission given the particular configuration of an environment.

As discussed above, cloud computing environment 102 may include, for example, a cloud computing service with a plurality of permissions associated with one or more virtualized identities. Group 201 of FIG. 2 illustrates the different least-privilege damage sub-scores that may be calculated for each permission. Sub-scores may be calculated based upon the permission's type, the affected resources, special risk factors, or other considerations. For example, an individual sub-score for each permission may be calculated for each one of the considerations shown in group 201. Thus, as illustrated in FIG. 2, for a given permission, a separate sub-score may be calculated based upon the permission's category, the permission's self-frequency, the permission's general frequency, the resource's service, the target resource's type, the resource's sensitivity profile, the resource's size, presence of or possibility of shadow administrators, the permission's frequency in attacks, unusually sensitive target resources, the security status of an entity associated with the permission, etc. While this list is not exhaustive, each of the exemplary sub-scores listed are discussed in greater detail below. In some embodiments, one or more of the sub-scores may be automatically assigned. For example, a machine learning algorithm may be used to learn the attributes, usage, etc. of different permissions for different entities, then assign sub-scores based upon that information. In some embodiments, one or more of the sub-scores may be manually configured.

Different types of permissions may be broken down into a plurality of predefined categories corresponding to different risk levels. For example, "list" and "describe" permissions (and other read-only permissions) may receive a category risk level of 1 (low), while "create user" and "delete user" permissions may receive a category risk level of 5 (high), thus creating a range of possible sub-scores based on the permission's category. A permission's self-frequency sub-score may be based upon a determination of how ordinary and frequent it is for the permission to be used by the particular identity it is associated with. For example, an entity using CreateGroup and CreateRole permissions in the past, would be reasonably expected have the CreateUser permission, thus the self-frequency potential damage score would be relatively low compared to an identity that has the CreateUser permission but has never used a "create" permission before. Similarly, a permission general frequency sub-score may be based upon a determination of how often the permission is used overall in the entire environment. For example, a more sensitive permission would often be used less frequently and used by fewer identities in the environment, and thus would receive a higher sub-score for being a more sensitive permission.

Separate sub-scores may also be calculated for the considerations related to the affected resources. The affected resource may be the target resource to which the permission grants access, ability to update, ability to alter, etc., for example, a cloud computing service, computing device, database, or similar resource. The resource's service sub-score may be based upon pre-assigned groupings of different services. Similarly, a service type sub-score may be calculated based upon the type of service offered. For example, search tools may present less risk and thus have lower service type sub-scores than storage services or authentication resources. A sub-score may also be calculated for the target resource's sensitivity profile. The sensitivity profile sub-score may be based upon a pre-defined score quantifying how sensitive the target resource is to attack. For example, a publicly available resource may be less sensitive than a resource containing secret data and/or requiring authentication for access. Accordingly, the publicly available resource may have a lower sensitivity profile sub-score. A sub-score may also be calculated based upon the size of the target resource(s). For example, if the permission affects a small number of resources or identities, it may have a lower target resource size sub-score than a permission affecting hundreds of resources or identities.

Separate scores may also be calculated for the considerations related to other special risk factors. Special risk factors may include the presence of or possibility of shadow admins, the permission's frequency in attacks, unusually sensitive target resources, or the security status of entity the permission. For example, a shadow network administrators sub-score may be high if the permission has the equivalent power of full administrative or root privileges. In some embodiments, the shadow network administrator sub-score may be a binary score, i.e., either 1 or 0, or either yes or no, indicating that the entity either is or is not a shadow admin. In some systems, a certain permission may have been used in past attacks. Thus, a sub-score may be calculated based upon the permission's frequency in previous attacks, giving a higher score to permissions that are likely to be used in an attack again. An unusually sensitive target may be, for example, a database containing extremely sensitive information. Thus, even a "read" permission on such a sensitive database may have an unusually high damage potential. The entity's security status sub-score may also relate to the type of security implemented by the entity associated with the permission. For example, if the entity with the unused permission is not secure, it may have a higher probability of being compromised, and thus may be assigned a higher damage sub-score. In some embodiments, this score may be calculated based upon an assessment of the parameters of a privileged access security system, including password age, credentials complex policy, automatic credential rotation, multi-factor authentication, credential protection in the end-points or servers, the number of people with access to the entity's credentials, the number of employees with access to the entity's password, whether the credentials are being used directly in code, etc.

In some embodiments, one or more of the sub-scores may be combined to form aggregate scores 202. Aggregate scores may be created by normalizing and weighting sub-scores. For example, a permission's sub-scores corresponding to permission category, permission self-frequency, and permission general frequency may be combined to form a weighted aggregate Permission's Type Score. Similarly, a permission's resource's service, target resource type, resource sensitivity profile, and resource size may be combined to form an aggregate Target Resources Score. Likewise, in some embodiments, the permission sub-score corresponding to the presence of or possibility of shadow admins, the permission's frequency in attacks, unusually sensitive target resources, and the security status of entity the permission may be combined to form an aggregate Special Risk Factors Score.

To calculate the aggregate scores 202, each sub-score within group 201 may be assigned an absolute or relative weight. For example, the more critical scores may receive a weight of 50, while the less critical scores may receive a weight of 5. The sub-score 202 may then be calculated using the different separate scores, which may be weighted and normalized into a single score. An exemplary equation for calculating the weighted aggregate Permission Type score is shown below, where N1 corresponds to the maximum permission category sub-score, N2 is the maximum permission self-frequency sub-score, and N3 is the maximum permission general frequency sub-score. In some embodiments, other aggregate scores may be calculated in a similar manner. Weights may be assigned manually or automatically. In some embodiments, the weights may be dynamically adjusted, by, for example, a machine learning algorithm.

$$\frac{(\text{Permission Category score}) \times (weight1) + (\text{Self Frequency score}) \times (weight2) + (\text{General Frequency score}) \times (weight3)}{N1 \times (weight1) + N2 \times (weight2) + N3 \times (weight3)}$$

Calculating the score using the equation shown above may result in an aggregate least-privilege damage score with a value between 0 and 1. The closer a permission's score is to 1, the higher the potential damage the permission may cause. Likewise, the closer a score is to 0, the lesser the potential damage. Other variations on this equation, and the resulting score range, are possible as well.

In some embodiments, aggregate scores 202 that correspond to an entity may be combined to form the Entity's Least-Privilege Damage Score 203. The Entity's Least-Privilege Damage Score 203 is described in greater detail with respect to FIG. 3, below.

Figure 3:
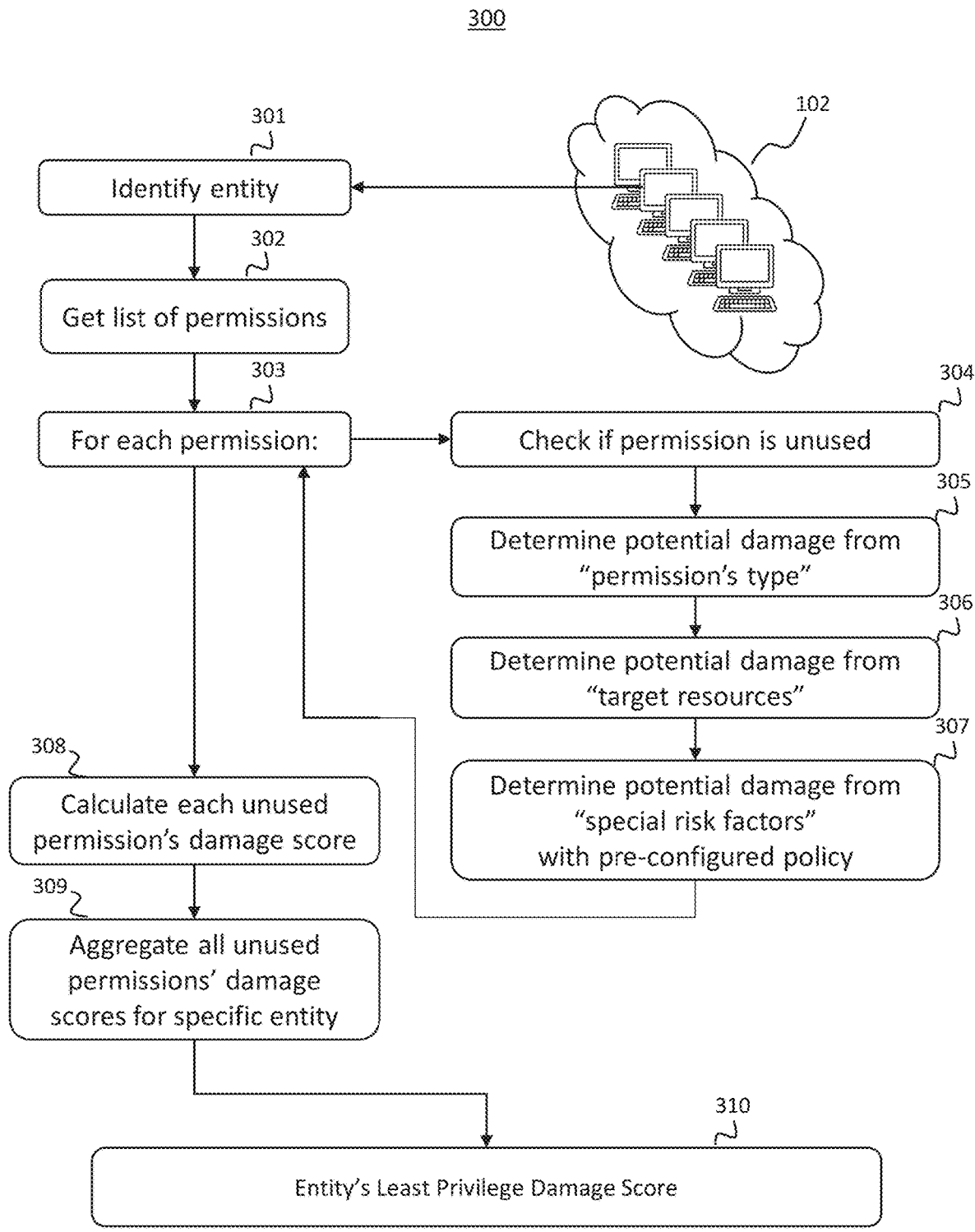
FIG. 3 is a flowchart depicting an exemplary process for calculating an entity's least-privilege damage score, consistent with embodiments of the present disclosure.

FIG. 3 is a flowchart depicting an exemplary process 300 for calculating an entity's least-privilege damage score. Process 300 may be carried out by, for example, security server 105 as discussed above in connection with FIG. 1. At step 301, process 300 may include identifying an entity (e.g., network identity) associated with cloud computing environment 102 that has one or more permissions. Consistent with the discussion above, this may include accessing a network directory service (e.g., Microsoft Active Directory™, AWS Managed Microsoft AD™, JumpCloud™ directory, etc.) or a cloud orchestration service (e.g., cloud orchestrator 103). At step 302, process 300 may retrieve a list of permissions associated with the entity. In some embodiments, the list of permissions may be retrieved from security server 105. In some embodiments, the security server 105 may retrieve the permissions list from database 106. For example, as discussed above, security server 105 and/or cloud orchestrator 103 may manage permissions using platforms such as CyberArk's Privileged Access Security™, Centrify's Privileged Access Servicer™, IBM's Security Privileged Identity Manager™, AWS's Identity and Access Management™, Azure's Active Directory Privileged Identity Management™, or various others.

At step 303, process 300 may iterate through a plurality of sub-steps, 304-307, for each permission identified in the list of permissions. In step 304, process 300 may determine if the permission is unused. The determination of whether a permission is unused may be based on an assessment of one or more parameters associated with the use of permission. The criteria for whether a permission is considered unused may be configurable by the system, for example, by security server 105. In some embodiments, process 300 may determine that a permission is unused if the permission has never been used before. In further embodiments, process 300 may determine that a permission is unused if the permission has not been used with a certain period of time defined by the system. As an example, if a permission has not been used in the previous 3 months, process 300 may consider the permission unused. In some embodiments, the determination of whether a permission is used may be indicated by a usage status of the permission. The usage status may be a binary value (i.e., either 1 or 0, or either yes or no) indicating that the permission is either used or unused. In other embodiments, the usage status may be a sliding scale that indicates how much the permission is used (e.g., a scale of 1 to 10, with 1 being never used and 10 being used very frequently). In such embodiments, the system may a set threshold value to decide if a permission is used or unused. For example, a system may set a threshold of 4, meaning that any permission having a usage status value of less than 4 is considered unused.

If process 300 determines that a permission is unused, it may advance to step 305. If process 300 determines that a permission is used, process 300 may move on to evaluate another permission within the list of permissions.

In step 305, process 300 may determine the potential damage from the permission's type. The potential damage may be quantified as a score, level, category, etc. As discussed above with respect to FIG. 2, a permission type score may be calculated based upon one or more sub-scores associated with the permission, including permission category, permission self-frequency, permission general frequency, or others.

In step 306, process 300 may determine the potential damage based on the target resources associated with the entity and/or the privilege. The potential damage may be quantified as a score. As discussed above with respect to FIG. 2, a target resource score may be calculated based upon one or more sub-scores associated with the permission, including the resource's service, target resources type, resource's sensitivity profile, and resource's size.

In step 307, process 300 may determine the potential damage based on special risk factors. The potential damage may be quantified as a score. As discussed above with respect to FIG. 2, a target resource score may be calculated based upon one or more sub-scores associated with the permission, including the potential for shadow admins, permission's frequency in attacks, sensitive target resources, and the entity's security status. The determination may be based upon pre-configured policies that define special risk factors or the scores associated with the special risk factors.

In step 308, process 300 may calculate a least-privilege damage score for each unused permission. In some embodiments, the least-privilege damage score may be calculated by weighting and combining the potential damage scores from the permission's type, target resources, and special risk factors, calculated in steps 305-307 above. The score may be calculated using, for example, the techniques discussed above. The score may be expressed as a numerical value (e.g., between 0 and 1, or 1 and 100), a percentage, a level, a category, etc.

In step 309, process 300 may aggregate all of the unused permissions' damage scores calculated in step 308. In step 310, process 300 may output the entity's least-privilege damage score, calculated from the aggregate of the of the unused permissions' damage scores for the entity. In some embodiments, the permission scores may be weighted when calculating the entity's least-privilege damage score. As discussed above with respect to FIG. 2, weights may be assigned manually or automatically by the system. In some embodiments, the weights may be dynamically assigned by, for example, a machine learning algorithm.

Figure 4:
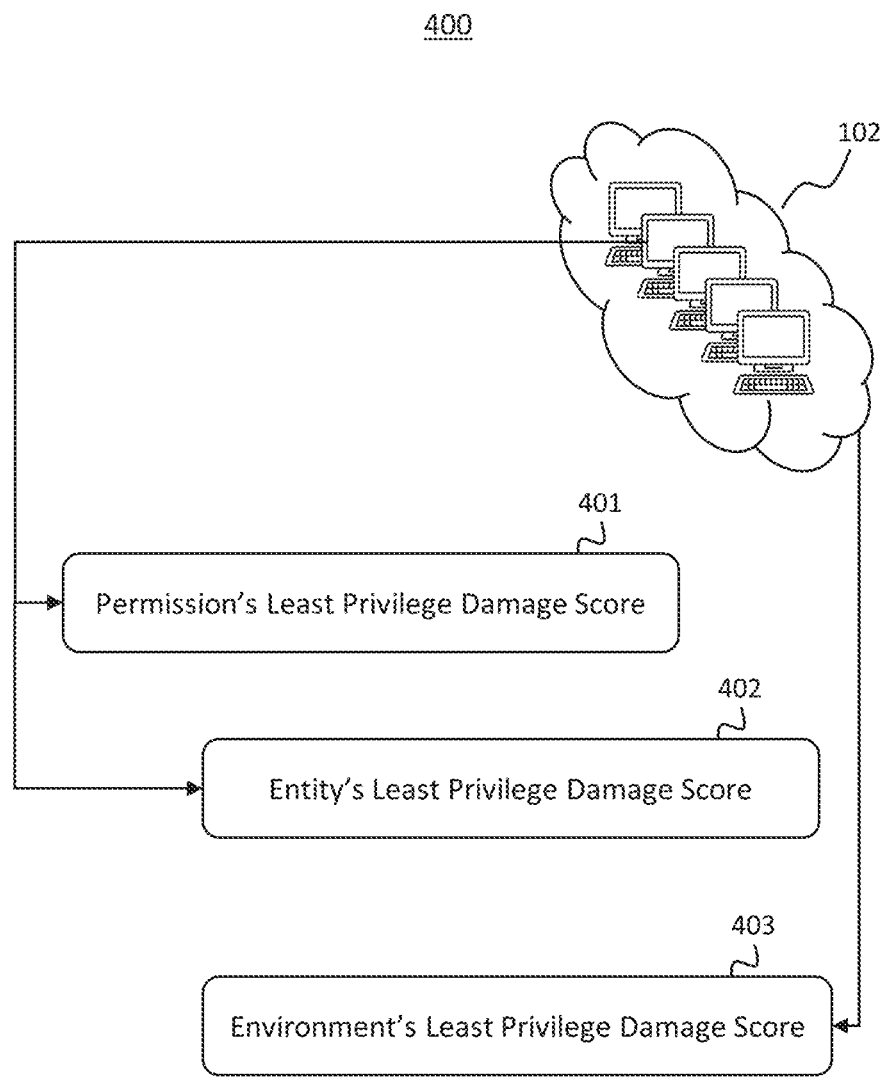
FIG. 4 is an illustration depicting multiple types of least-privilege damage scores, consistent with embodiments of the present disclosure.

FIG. 4 is an illustration of a system 400 depicting multiple types of least-privilege damage scores. A permission least-privilege damage score 401 may be calculated for each permission associated with an entity within cloud computing environment 102. As discussed above with respect to FIGS. 2 and 3, an entity's least-privilege damage score 402 may be calculated by aggregating the permission least-privilege damage scores 401 for each permission associated with the entity. Similarly, an environment's least-privilege damage score 403 may be calculated by aggregating the entity least-privilege damage scores 402 for each entity associated with the environment. Such aggregate scores may be calculated similarly to the equation discussed above with respect to FIG. 2. In some embodiments, the entity scores may be weighted such that the more sensitive or important entities are given more weight than less critical entities.

In some embodiments, least-privilege damage scores may be compared in order to prioritize which permissions/entities/environments should be addressed first or on a prioritized basis. For example, aggregate scores for several different entities may be compared. The entity with the highest score (most at risk), may be addressed first, consistent with FIG. 5, below. Then, the system may compare the scores corresponding to different permissions associated with the entity. The permission within the entity with the highest score may then be the first permission addressed by the system. Such prioritization permits the system to act most efficiently by addressing the most at-risk permissions/entities/environments first. In some embodiments, security server 105 may implement machine learning algorithms to more efficiently assign sub-scores, compare scores, and prioritize permissions/entities.

Figure 5:
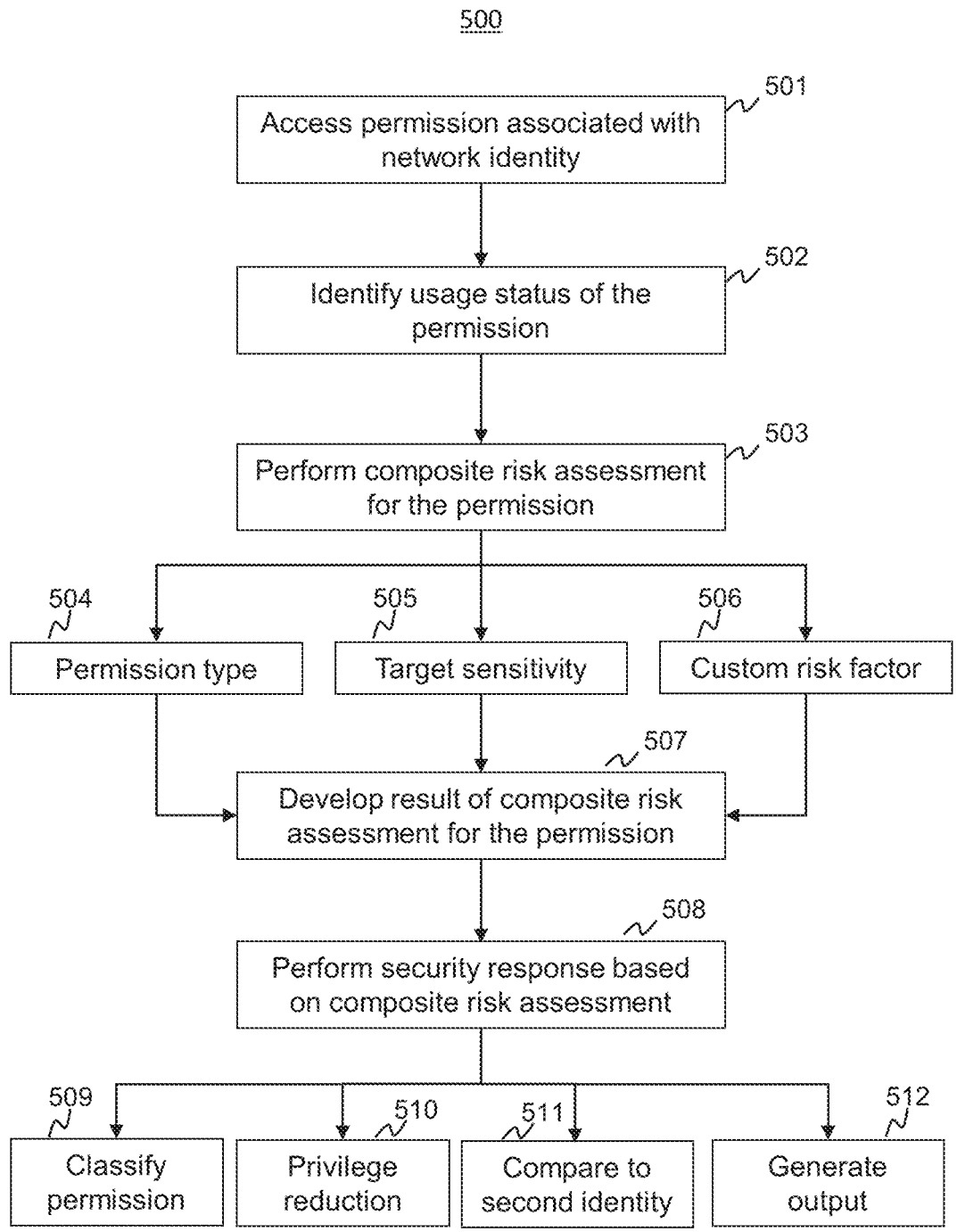
FIG. 5 is a flowchart depicting an exemplary process for performing a composite risk assessment and generating a security response, consistent with embodiments of the present disclosure.

FIG. 5 is a flowchart depicting an exemplary process 500 for performing a composite risk assessment and generating a security response. Process 500 may be executed by, for example, security server 105 as shown in FIG. 1. Process 500 may correspond to parts of FIGS. 2-4, and accordingly, descriptions of the components and processes therein may apply to process 500 as well. At step 501, process 500 may access a permission associated with a network identity. The network identity, for example, may be associated with client device 101.

At step 502, process 500 may include identifying a usage status of the accessed permission. The usage status, as described above with respect to FIG. 3, may be determined based upon, for example, whether the permission has ever been used, the number of times it has been used, whether the permission has been used within a specific time period, etc. In some embodiments, the usage status may be calculated based upon multiple factors. In some embodiments, the usage status may be a number that may be compared to a threshold value. In some embodiments, the usage status threshold value may be determined by the security server 105. If the usage status is below the threshold value, process 500 may continue to step 503. In some embodiments, if the usage status exceeds the threshold value, process 500 may not continue to step 503 and may not perform the composite risk assessment.

At step 503, process 500 may commence performing a composite risk assessment for the permission. The composite risk assessment may include identifying attributes of the permission (steps 504-506). Several examples of attributes of permissions were discussed above with respect to FIG. 2. Process 500 may further execute one or more of steps 504-506. At step 504, process 500 may identify a permission type. The permission type may include the function of the permission, for example, read, write, delete, create, list, describe, get, enable, tag, untag, deactivate, add, update, attach, etc. Permission type may also identify the frequency of use of the permission by a specific identity (self-frequency) or the frequency of usage of the permission by multiple identities (general frequency).

At step 505, process 500 may identify a target sensitivity. In some embodiments, the target sensitivity may be based upon a predefined classification of sensitivity. Predefined classifications of sensitivity may include publicly available resources, restricted resources, or restricted resources with secret data. Classifications may be defined such that most sensitive resources are given a higher classification score. The target sensitivity may also include a sensitivity score determined for the target resource. In further embodiments, the target sensitivity may be based on the size of the target resource. As discussed above with respect to FIG. 2, a smaller target resource may be less sensitive to attack.

At step 506, process 500 may identify one or more custom risk factors. In some embodiments, a custom risk factor may address whether the permission corresponds to a designated sensitive administrator privilege. As discussed above with respect to FIG. 2, a sensitive administrator privilege may be, for example, one that gives the identity full administrative or root power over the entity or the ability to create additional users. In some embodiments, the customized risk factor may address whether the permission corresponds to a designated sensitive target network resource. For example, a designated sensitive target network resource may be a database containing highly sensitive or secret information or an authentication resource that controls access to multiple entities. Such designated sensitive target resources may warrant greater security and may thus receive higher risk scores. In yet further embodiments, the customized risk factor may address whether the permission corresponds to a historical attack permission. A historical attack permission may be, for example, a permission that has been used in one or more previous malicious attacks waged on the corresponding entity or on other entities or environments. The custom risk factor may also correspond to a security status of the entity. In some embodiments, entities with greater security measures already in place may receive a lower score, indicating they are less susceptible to attack. For example, an entity with systems in place such as multi-factor authentication or CyberArk's Privileged Access Security™ Solutions may receive a lower score than entities without such security measures in place.

At step 507, process 500 may develop a result of the composite risk assessment for the permission. The result may be based upon the one or more permission attributes identified in steps 504-506. For each permission attribute identified in any one of steps 504-506, process 500 may create a corresponding potential damage score, as discussed above with respect to FIGS. 2-4. In some embodiments, the result may be a combination of the permission type, target sensitivity, or custom risk factor scores. Such a score may be calculated by assigning different weights to the permission type, target sensitivity, or custom risk factor scores and combining them into a single weighted score.

At step 508, process 500 may perform a security response based on the composite risk assessment. In some embodiments, based upon the score generated at step 507, process 500 may proceed to one or more of steps 509-512. In some embodiments, two or more of steps 509-512 may be performed simultaneously. In other embodiments, the steps may be performed sequentially. In yet further embodiments, process 500 may perform just one of steps 509-512.

At step 509, process 500 may classify the relevant permission. For example, based on the calculated score, the permission may be classified as a high-risk permission that likely needs to be removed. In other cases, the permission's score may be relatively low, which may cause it to be classified as, for example, a low-risk permission, which may not need to be altered.

At step 510, process 500 may reduce privileges associated with the permission. In some embodiments, if the score is relatively high, privileges for the corresponding identity might be reduced.

At step 511, process 500 may compare the score associated with the permission to a score of a permission associated with another identity. In some embodiments, the score associated with the permission may be compared to a score associated with another permission of the same identity. Such a score comparison may be possible because the scores for each permission are normalized. In some embodiments, process 500 may prioritize security responses based upon the comparison. For example, two scores corresponding to permissions from two different identities may be compared. The permission with the higher score, thus presenting a higher damage risk, may be prioritized such that it would be addressed first.

At step 512, process 500 may generate an output, such as a security report, alert, or least-privilege damage score report. In some embodiments, the output may be transmitted to security server 105. Security server 105 may evaluate the output and determine whether to take action and, if action is warranted, what action to take. For example, security server 105 may receive a least-privilege damage score report indicating that one entity has several unused high-risk permissions capable of causing great damage. The security server 105 may then cause those permissions to be revoked. In some embodiments, evaluations of the output and corresponding actions may happen automatically without sending the output to security server 105.

It is to be understood that process 500 may be performed for single permissions or multiple permissions. In some embodiments, process 500 may be performed for multiple permissions simultaneously. In further embodiments, process 500 may access multiple permissions at step 501 and may execute the process 500 for the multiple permissions, creating aggregate scores as described with respect to FIGS. 2-4. For example, process 500 may be conducted for all permissions present within a certain entity, or an entire network environment.

Figure 6A:
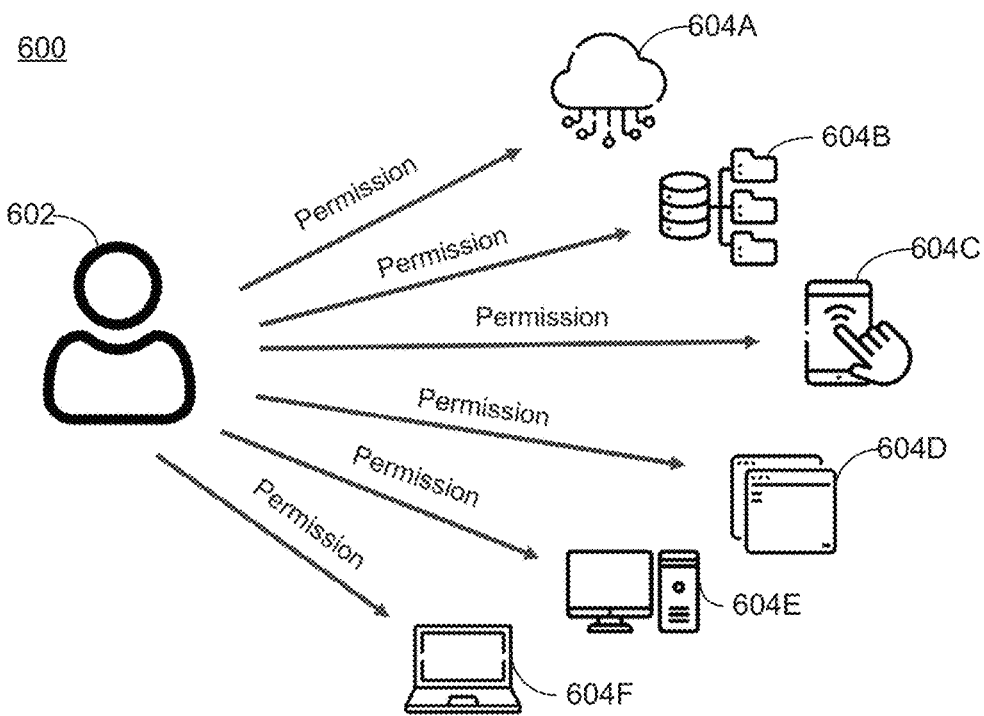
FIG. 6A is an illustration depicting relationships of a user with multiple network resources, consistent with embodiments of the present disclosure.

FIG. 6A includes an illustration 600 depicting relationships of a user 602 with multiple network resources 604A to 604F. The list of permissions associated with user 602 may be retrieved from security server 105. In some embodiments, security server 105 may retrieve the permissions list from database 106. For example, as discussed above, security server 105 and/or cloud orchestrator 103 may manage permissions using platforms such as CyberArk's Privileged Access Security™ Centrify's Privileged Access Service™, IBM's Security Privileged Identity Manager™, AWS's Identity and Access Management™, Azure's Active Directory Privileged Identity Management™, or various others. In disclosed embodiments, a processing device of system 100 (e.g., at least one processor 110) may estimate the potential damage and potential risk associated with each user in an organization based on, for example, a list of permissions associated with the user. The potential damage and potential risk may be quantified as a score, level, category, etc.

Figure 6B:
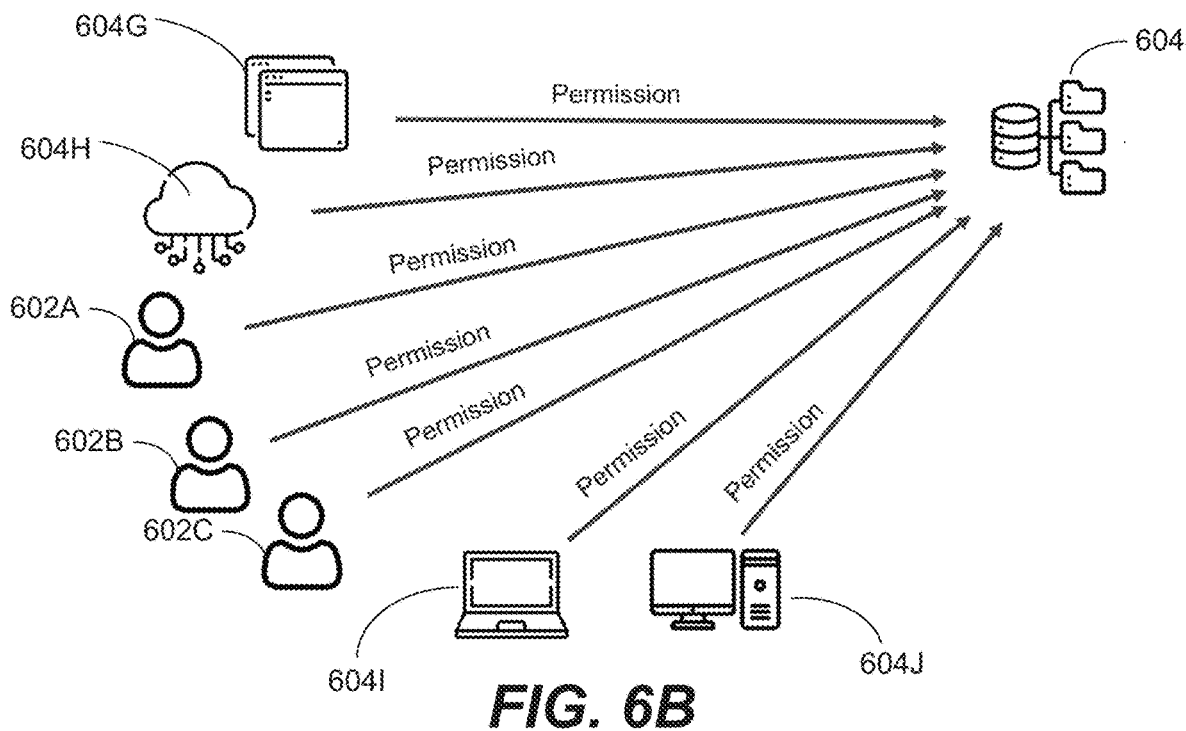
FIG. 6B is an illustration depicting relationships of a network resource with users and other network resources, consistent with embodiments of the present disclosure.

FIG. 6B includes an illustration 650 depicting relationships of a network resource 604 with users 602A to 602C and other network resources 604G to 604J, consistent with embodiments of the present disclosure. Similar to the processes discussed above, a processing device of system 100 may estimate the potential damage and potential risk associated with each network resource in an organization based on, for example, a list of permissions associated with network resource 604. A person skilled in the art would recognize that estimating the risk of all of the network resources in an organization may be more challenging than estimating the risk of all of the users in the organization, because there are significantly more network resources than users. For example, each machine in an organization can have thousands of files, and each cloud application may contain dozens of serverless functions. Not all of the network resources have the same value to the organization. For example, the same unused permissions on different network resources may be associated with different risk levels; and each network resource 604 may be associated with different potential damage if compromised. Specifically, an unused permission of "Read-File" on a network resource that contains public website images does not have the same potential damage as an unused permission of "Read-File" on a network resource that contains credit card details. Therefore, there is a need in determining the risk score of network resources to mitigate unnecessary risks. In one implementation, the determination of the risk score may include identifying unused permissions associated with network resource 604.

Figure 7:
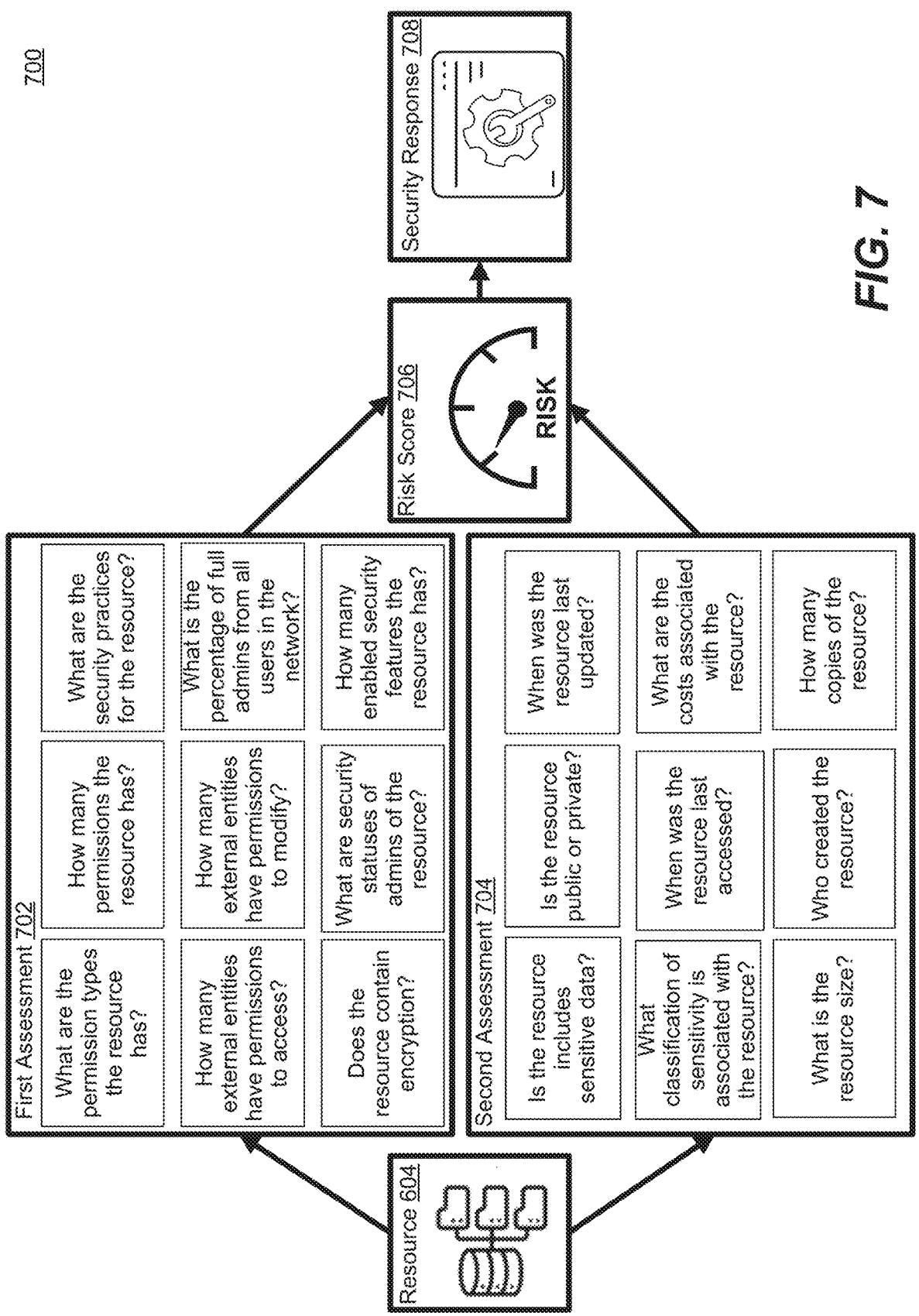
FIG. 7 is an illustration of an exemplary process flow for performing security responses based on a determined risk score of a network resource, consistent with embodiments of the present disclosure.

FIG. 7 is an illustration of an exemplary method 700 for performing a security response based on a determined risk score of network resource 604. Method 700 includes performing a first assessment 702 and a second assessment 704 to estimate the vulnerability and the importance of network resource 604. Based on the result of first assessment 702 and second assessment 704, a composite risk score 706 for network resource 604 may be determined. Thereafter and in view of composite risk score 706, at least one security response 708 may be executed.

Consistent with embodiments of the present disclosure, first assessment 702 may be used to determine the vulnerability level of network resource 604 based on a first set of factors, and second assessment 704 may be used to determine the importance level of network resource 604 based on a second set of factors. In some embodiments, a pair of scores may be calculated for each network resource 604: a first score based on values associated with the first set of factors of first assessment 702, and a second score based on values associated with the second set of factors of second assessment 704.

According to some embodiments, for a given network resource 604, first assessment 702 may involve calculating separate values to a plurality of factors to determine the vulnerability level of network resource 604. For example, as illustrated in FIG. 7, the plurality of factors that may be used in first assessment 702 may include: determining what are the permission types that network resource 604 has, how many permissions network resource 604 has, what are the security practices that network resource 604 has, how many external entities have permissions to access network resource 604, how many external entities have permissions to modify network resource 604, what is the percentage of full network administrators from all users in a network of the organization, does network resource 604 contain encryption, what are the security statuses of network administrators of network resource 604, how many enabled security features network resource 604 has, and more. This example list of factors is not exhaustive and not all of the listed factors may be calculated for determining the vulnerability level of every network resource. Moreover, other factors—not included in the list above—may be used in determining the vulnerability level of network resource 604.

In some embodiments, first assessment 702 may be based on a subset of the listed factors shown in FIG. 7. The subset of the listed factors may be determined based on at least one detail characterizing the network resource (e.g., the type of network resource, the identity of the creator of the network resource, the identity of the last user that modified the network resource, the last date the network resource was accessed, etc.). In one embodiment, a first subset of the listed factors may be used to determine the vulnerability level of a first type of network resources, and a second subset of the listed factors may be used to determine the vulnerability level of a second type of network resources. In additional embodiments, one or more of the values of the factors of first assessment 702 may be automatically assigned. For example, a machine learning algorithm may be used to learn the attributes, usage, permissions, etc., for different network resources. Then, the machine learning algorithm may assign values based upon that information. In some embodiments, one or more of the values may be manually configured to one or more network resources.

According to some embodiments, for a given network resource 604, second assessment 704 may involve calculating separate values to a plurality of factors to determine the importance level of network resource 604. For example, as illustrated in FIG. 7, the plurality of factors that may be used in second assessment 704 may include: determining if network resource 604 includes sensitive data, if network resource 604 is public or private, when was network resource 604 last accessed, when was network resource 604 last updated, what classification of sensitivity is associated with network resource 604, what are the costs associated with network resource 604, what is the size of network resource 604, who created network resource 604, and how many copies of network resource 604, are there, among others. This example list of factors is also not exhaustive and not all of the listed factors may be calculated for determining the importance level of every network resource. Moreover, other factors—not included in the list above—may be used in determining the importance level of network resource 604.

In some embodiments, second assessment 704 may be based on a subset of the listed factors shown in FIG. 7. The subset of the listed factors may be determined based on at least one detail characterizing the network resource. For example, a first subset of the listed factors may be used to determine the importance level of an encrypted network resource, and a second subset of the listed factors may be used to determine the importance level of a non-encrypted network resource. In additional embodiments, one or more of the values of the factors of second assessment 704 may be automatically assigned. For example, a machine learning algorithm may be used to learn the attributes, usage, permissions, etc., for different network resources. Then, the machine learning algorithm may assign values based upon that information. In some embodiments, one or more of the values may be manually configured to one or more network resources.

Different values may be calculated for the different factors of first assessment 702 and second assessment 704. In some embodiments, values of some of the factors may have a binary value indicating whether a certain condition exists (e.g., either 1 or 0, or either yes or no). An example factor that may have a binary value may be: does network resource 604 contain encryption? In other embodiments, the values of some of the factors may have a sliding scale that indicates the level on which a certain condition exists (e.g., a scale of 1 to 10). Other factors may have other types of values, such as numbers or dates. System 100 may assign scores to calculated values of factors based on predefined rules. For example, the factor "when was the resource last accessed?" may be assigned the score 10 when the determined value is "within the last 3 days," may be assigned the score 9 when the determined value is "between four days and a week", may be assigned the score 8 when the determined value is "more than week less than two weeks," and may be assigned the score 1 when the determined value is "not accessed for more than a year."

To calculate risk score 706, each factor within first assessment 702 and second assessment 704 may be assigned an absolute or relative weight. For example, the more critical factors may receive a weight of 50, while the less critical factors may receive a weight of 5. Risk score 706 may then be calculated using the different separate values of the factors, which may be weighted and normalized into a single score. An exemplary equation for calculating the weighted aggregate risk score is shown below, where K1 corresponds to the maximum value associated with the first factor, K2 corresponds to the maximum value associated with the second factor, and KN corresponds to the maximum value associated with the N factor. Weights may be assigned manually or automatically. In some embodiments, the weights may be dynamically adjusted, by, for example, a machine learning algorithm.

$$\text{risk score} = \frac{1}{x} \times \text{First assessment} + \left(\frac{x-1}{x}\right) \times \text{Second assessment}$$

wherein the first or second assessment is $$= \frac{(factor1 \text{ score}) \times (weight1) + \ldots + (factor\ N \text{ score}) \times (weightN)}{K1 \times weight1 + K2 \times weight2 + \ldots + KN \times weightN}$$

Calculating the risk score using the example equation shown above may result in a composite risk score with a value between 0 and 1. The closer risk score is to 1, the higher potential damage associated with the network resource. Likewise, the closer a score is to 0, the lesser the potential damage. Other variations on these equations, and the resulting risk score range, are possible as well.

In disclosed embodiments, system 100 may execute security response 708 based on a determined composite risk score 706. Examples of security responses are discussed below with references to steps 820-830. The security responses may be performed simultaneously. In other embodiments, the security responses may be performed sequentially. In yet further embodiments, only one security response may be performed.

Figure 8:
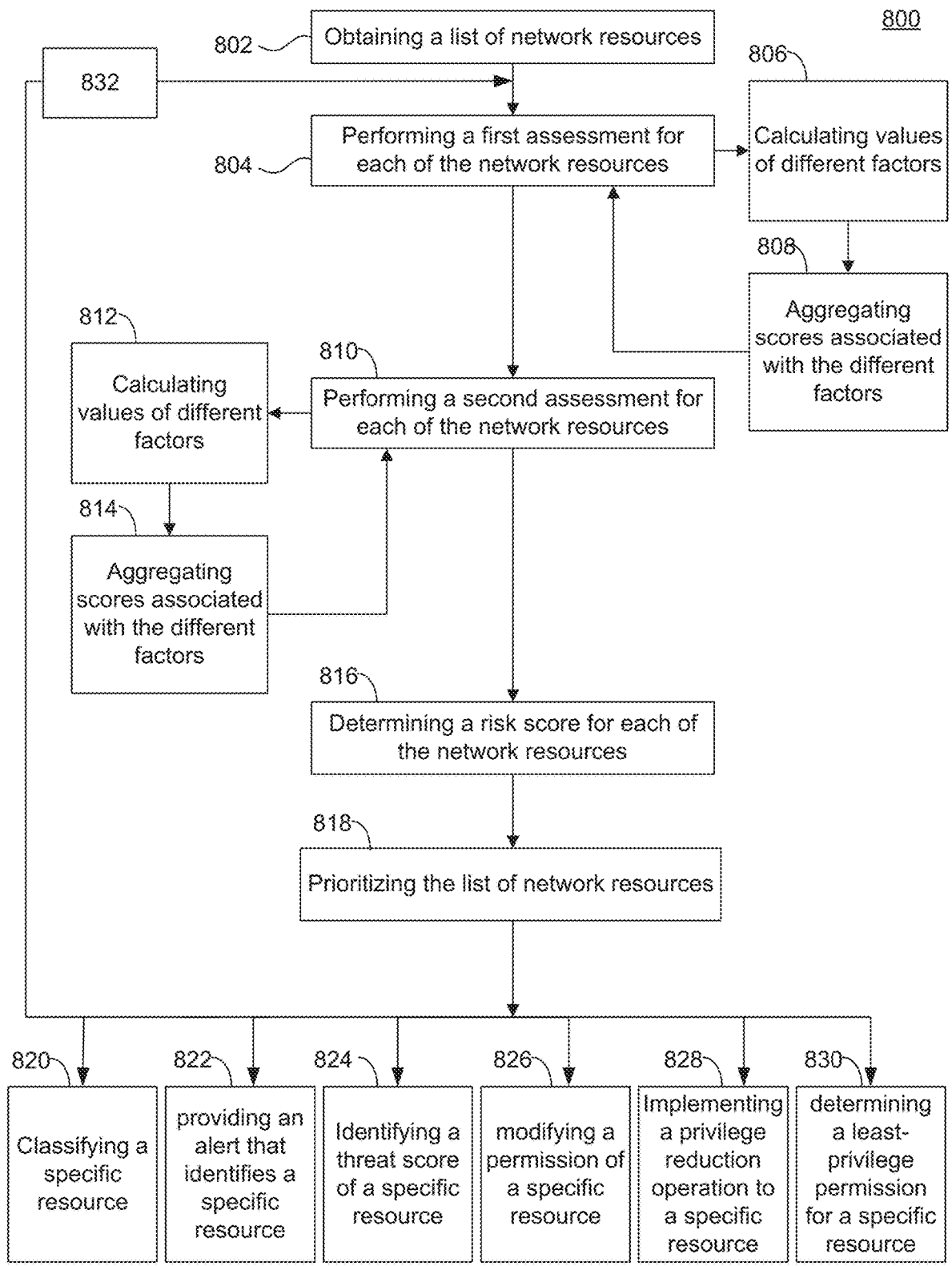
FIG. 8 is a flowchart depicting an exemplary process for performing security responses based on determined risk scores of multiple network resources, consistent with embodiments of the present disclosure.

FIG. 8 is a flowchart depicting an exemplary process 800 for performing a composite risk assessment and generating a security response. Process 800 may be executed by, for example, at least one processor 110 of security server 105 as shown in FIG. 1. Process 800 may correspond to parts of FIG. 7, and accordingly, descriptions of method 700 may apply to process 800 as well.

At step 802, process 800 may comprise obtaining a list of network resources. The list of network resources may include a portion of or all of the network resources of an organization, or a portion of or all of the network resources associated with a computing device (e.g., a server). In some examples, the list of network resources may be obtained at startup, at shutdown, at constant intervals, at selected times, in response to a request received from a user, or at any other determined times.

At step 804, process 800 may perform a first assessment for each of the network resources. The first assessment may include calculating values of different factors and aggregating scores associated with the different factors (steps 806 and 808). In one embodiment, the first assessment may be based on at least three of: a permission type associated with a corresponding network resource; a number of permissions associated with a corresponding network resource; an indication of security practices that a corresponding network resource follows; a number of enabled security features for a corresponding network resource; a number of external entities with permissions to access a corresponding network resource; a number of external entities with permissions to modify a corresponding network resource; a percentage of full network administrators from all users in a network environment with permission to access a corresponding network resource; security statuses of network administrators associated with a corresponding network resource; or an indication of whether a corresponding network resource is encrypted. In other embodiments, the first assessment may be based on at least four, at least five, or at least six of the factors listed above, among others.

At step 810, process 800 may perform a second assessment for each of the network resources. The second assessment may include calculating values of different factors and aggregating scores associated with the different factors (steps 812 and 814). In one embodiment, the second assessment may be based on at least three of: an indication of whether a corresponding network resource includes sensitive data; an indication of when a corresponding network resource was last accessed; an indication of when a corresponding network resource was last updated; a size of a corresponding network resource; a predefined classification of sensitivity associated with a type of a corresponding network resource; an indication of whether a corresponding network resource is public or private; costs associated with a corresponding network resource; an identity that created a corresponding network resource; or a number of copies of a corresponding network resource. In other embodiments, the second assessment may be based on at least four, at least five, or at least six of the factors listed above, among others.

At step 816, process 800 may determine a risk score for each of the network resources. As used herein, the term "risk score" refers to a score that can be assigned based on the outcomes of the first assessment and the second assessment. A risk score may have a standard value (e.g., a number) or a multi-value threshold (e.g., a line on a graph). The value of the risk score may correlate to the deviation, upwards or downwards, from a reference risk score associated with a specific network resource, a reference risk score associated with a general network resource, or a reference risk score associated with the same network resource. In certain embodiments, if a risk score is greater than a reference risk score, there is increased likelihood that an undesirable event that may involve a network resource being compromised. In some embodiments, the magnitude of a risk score associated with a specific network resource or the amount by which it exceeds a reference risk score, may be indicative of the risk associated with that specific network resource.

At step 818, process 800 may prioritize the list of network resources. Consistent with the present disclosure, a trained machine learning algorithm may be used to prioritize the list of network resources. The machine learning algorithm may include one or more formulas, one or more functions, one or more rules, and/or one or more procedures. In one embodiment, the determined risk score for each of the network resources may be used as input to the formulas, functions, rules, and/or procedures, and the inferred output of the trained machine learning algorithm may be based on the outputs of the formulas, functions, rules and/or procedures. In some embodiments, the output of the trained machine learning algorithm may be used to compare one network resource to another using a statistical measure of the outputs of the formulas, functions, rules, and/or procedures. In other embodiments, the output of the trained machine learning algorithm may be used to calculate measurable scores for selecting which security responses to perform on the network resources.

In a specific exemplary embodiment, the machine learning algorithm may be associated with at least one rule defining how to prioritize between network resources assigned with a same risk score. The at least one rule may include any instruction that may cause an effect based on an occurrence or a condition of an occurrence. In a simplified example, a first network resource was assigned a score of 8 by the first assessment, was assigned a score of 7 by the second assessment; and the composite risk score of the first network resource was determined to be 7.5. A second network resource was assigned a score of 9 by the first assessment, was assigned a score of 6 by the second assessment; and the composite risk score of the second network resource was also determined to be 7.5. In one implementation, the at least one rule may be based on previous scores associated with the network resource. For example, assuming the vulnerability of second network resource jumped from 4 to 9 due to recent user actions, the at least one rule may be configured to cause at least one processor to perform one or more security responses regarding the second network resource and to avoid (for now) performing a security response regarding the first network resource. Alternatively, the at least one rule may be configured to cause at least one processor to perform at least a first security response involving the second network resource and at least a second security response involving the first network resource.

Thereafter, process 800 may perform one or more security responses based on the determined risk score and according to the determined prioritization. Specifically, at step 820, process 800 may classify a specific network resource. For example, based on the calculated risk score, the specific network resource may be classified as a high-risk resource that likely needs to be monitored or having one of its properties (e.g., permission) altered. In other cases, the calculated risk score may be relatively low, which may cause the specific network resource to be classified as, for example, a low-risk resource, which may not need to be monitored or having one of its properties altered. At step 822, process 800 may provide an alert that identifies the specific network resource when a risk score of a specific network resource is greater than a threshold. The value of the threshold may be predetermined for each type of network resource or may be dynamically selected based on different considerations. In some embodiments, the alert may be provided to security server 105 or to an administrator of an organization associated with the network resources.

At step 824, process 800 may generate an output identifying a threat score of a specific resource. In some embodiments, the output may be transmitted to security server 105. Security server 105 may evaluate the output and determine whether to act and, if action is warranted, what action to take. For example, security server 105 may receive a risk score report indicating which network resources have the potential of causing great damage. The security server 105 may then cause permissions for these network resources to be revoked or even having some of these network resources deleted. In some embodiments, evaluations of the output and corresponding actions may happen automatically without sending the output to security server 105.

At step 826, process 800 may modify at least one permission associated with a specific network resource. In some embodiments, modifying a permission associated with a specific network resource may cause the specific network resource to be less vulnerable, for example, by requiring authentication to access specific network resource. At step 828, process 800 may include reducing privileges associated with a specific network resource. In some embodiments, when the risk score is relatively high, privileges for the specific network resource might be reduced. At step 830, process 800 may include determining a least-privilege permission for the specific network resource. The determined least-privilege permission for the specific network resource may be at least one of: a read permission, a write permission, a delete permission, or a create permission. In one example, step 830 may be implemented after a determination that a specific network resource is associated with a result of the first assessment greater than a first threshold and/or a result of the second assessment greater than a second threshold.

At step 832, process 800 returns to step 804 to perform an additional first assessment of at least some of the network resources. If the additional first assessment of at least some of the network resources results in identifying a change in an original result of the first assessment for at least one network resource, process 800 may include updating the composite risk score for the at least one network resource and performing a security response based on the updated composite risk score of the at least one network resource. In addition, process 800 may include performing an additional second assessment of at least some of the network resources. If the additional second assessment of at least some of the network resources results in identifying a change in an original result of the second assessment for at least one network resource, process 800 may include updating the composite risk score for the at least one network resource, and performing an additional security response based on the updated composite risk score of the at least one network resource.

It is to be understood that process 800 may be performed concurrently or sequentially to determine the risk scores of multiple network resources. Moreover, process 800 may be conducted for part of or all of the network resources stored within a certain computing device, or an entire network environment.

Figure 9:
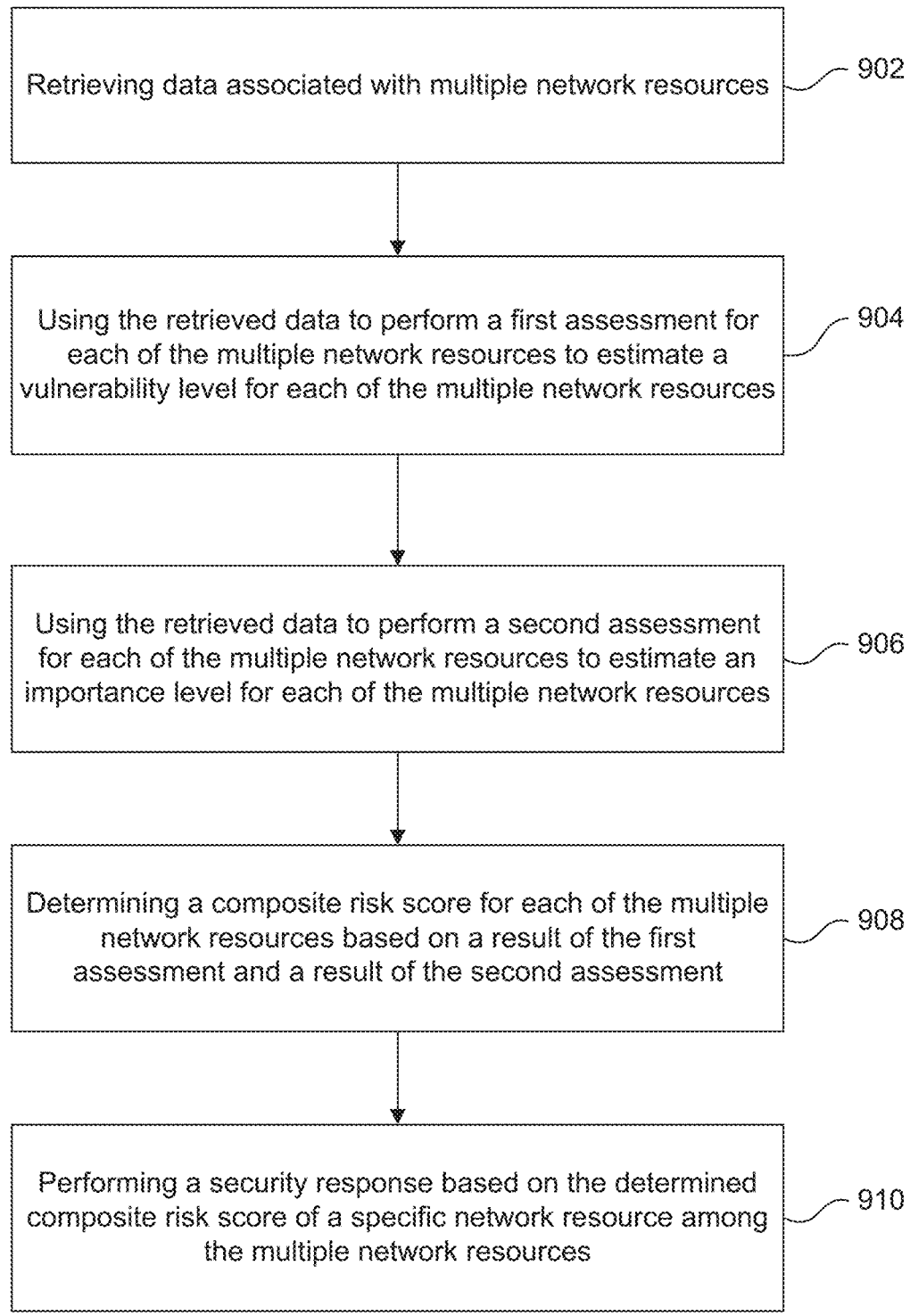
FIG. 9 is a flowchart depicting an exemplary process for developing composite risk scores for network resources, consistent with embodiments of the present disclosure.

Reference is now made to FIG. 9, which depicts an example method 900 that may be executed by, for example, security server 105 as shown in FIG. 1, consistent with the present disclosure. In one embodiment, all of the steps of method 900 may be performed by components of system 100. It will be appreciated, however, that other implementations are possible and that other components may be utilized to implement method 900. It will be readily appreciated that the illustrated method can be altered to modify the order of steps, delete steps, or further include additional steps.

At step 902, a processing device (e.g., at least one processor 110) may retrieve data associated with multiple network resources. In some embodiments, the data associated with the multiple network resources may be retrieved from multiple sources. The multiple sources may include the network resources themselves (e.g., integrate with and query the resources and get information on them). The multiple sources may further include management and security systems in the network (e.g., integrate with and query centralized systems in the network that may have details on network resources being evaluated). The multiple sources may further include logs (e.g., integrate with and retrieve data from logs and analysis activity and usage properties). The multiple sources may further include human inputs and manual configurations (e.g., the organization and the system's users may add data sources and even manually add their data input to the system). Specifically, the owners may add their knowledge of their network resources to the system.

In addition, the processing device may obtain insights from origins of the network resources. In a first example, when the network resource is a file, the processing device may determine that a certain file has a high-risk score because it was downloaded from the internet and not from an internal server. In a second example, when the network resource is a database, the processing device may determine that a certain database has a high-risk score because its current location is shared with people outside the organization. In a third example, when the network resource is a serverless function, the processing device may determine that a certain serverless function has a high-risk score because it was developed by an external vendor and not internally by the organization. Consistent with the present disclosure, the data associated with the multiple network resources may include at least one of: data from types of text and strings, binary data, numbers (e.g., integers and doubles), network traffic data, metadata associated with the network resource. Specifically, the retrieved data may include activity data of the network resources, users' data, cost data of the network resources, creation and modification data, sensitivity information, permissions data, security properties data, types of the network resources, size data, or metadata associated with the network resources.

At step 904, the processing device may use the retrieved data to perform a first assessment for each of the multiple network resources to estimate a vulnerability level for each of the multiple network resources. For example, the first assessment may include determining which identities have permissions to access a corresponding network resource. Consistent with the present disclosure, performing the first assessment may be based on a set of factors. In one embodiment, the set of factors may involve at least one of the following first group of factors: a permission type associated with a corresponding network resource, the number of permissions associated with a corresponding network resource, or an indication of security practices that a corresponding network resource follows. In another embodiment, the set of factors may involve at least one of the following second group of factors: the number of enabled security features for a corresponding network resource, the number of external entities with permissions to access a corresponding network resource, or the number of external entities with permissions to modify a corresponding network resource. In another embodiment, the set of factors may involve at least one of the following third group of factors: a percentage of full network administrators from all users in a network environment with permission to access a corresponding network resource, security statuses of network administrators associated with a corresponding network resource, or an indication of whether a corresponding network resource is encrypted. In addition, performing the first assessment may include developing a result by accounting for one or more weights associated with any combination of factors associated with of the first assessment.

At step 906, the processing device may use the retrieved data to perform a second assessment for each of the multiple network resources to estimate an importance level for each of the multiple network resources. For example, the second assessment may include determining whether a corresponding network resource has been used within a threshold amount of time. Consistent with the present disclosure, performing the second assessment may be based on a set of factors. In one embodiment, the set of factors may involve at least one of the first group of following factors: an indication of whether a corresponding network resource includes sensitive data, an indication of when a corresponding network resource was last accessed, or an indication of when a corresponding network resource was last updated. In another embodiment, the set of factors may involve at least one of the following second group of factors: a size of a corresponding network resource, a predefined classification of sensitivity associated with a type of a corresponding network resource, or an indication of whether a corresponding network resource is public or private. In another embodiment, the set of factors may involve at least one of the following third group of factors: costs associated with a corresponding network resource, an identity that created a corresponding network resource, or the number of copies of a corresponding network resource. In addition, performing the second assessment may include developing a result of the second assessment by accounting for one or more weights associated with any combination of factors the factors of the second assessment.

At step 908, the processing device may determine a composite risk score for each of the multiple network resources based on a result of the first assessment and a result of the second assessment. In some embodiments, the processing device may also normalize the composite risk score for each of the multiple network resources to quantify an extent of threat associated with each of the multiple network resources. Upon normalizing the composite risk score, the processing device may prioritize the multiple network resources by identifying which of the multiple network resources have higher risk score (e.g., identifying a specific resource that has the highest risk score). The identification may include detecting the network resource with the highest risk score or a group of network resources with the highest risk score (e.g., a risk score with a value higher than a threshold value). In additional embodiments, the processing device may determine the composite risk score for all network resources in a network environment and develop an environment-wide result of the composite risk score for all network resources in the network environment.

At step 910, the processing device may perform a security response based on the determined composite risk score of a specific network resource among the multiple network resources. Consistent with the present disclosure, it may be desirable to limit the number of permissions that network resources in an environment have to only the permissions that are needed for a particular network resource to be utilized, and no more (e.g., in scope or time). Reducing the number of unused permissions may reduce the number of potential avenues of attack for a malicious entity, without affecting legitimate operations in the environment. In one example, the security response may include determining a least-privilege permission for the specific network resource. Specifically, the determined least-privilege permission for the specific network resource may include at least one of: a read permission, a write permission, a delete permission, or a create permission. In one embodiment, the processing device may apply the determined least-privilege permission for the specific network resource after determining that the specific network resource is associated with a result of the first assessment greater than a first threshold, a result of the second assessment greater than a second threshold, or a result of the composite risk score greater than a third threshold, or any combination thereof. In other embodiments, the security response may include at least one of: classifying the specific network resource, providing an alert that identifies the specific network resource when a risk score of the network resource is greater than a threshold, generating an output identifying a risk score of the specific network resource, modifying at least one permission associated with the specific network resource, or identifying the specific network resource as a candidate for a privilege reduction operation.

In additional embodiments, the processing device may perform an additional first assessment of at least some of the network resources, identify a change in a result of the first assessment for at least one network resource, update the composite risk score for the at least one network resource, and performing an additional security response based on the updated composite risk score of the at least one network resource. Similarly, the processing device may perform an additional second assessment of at least some of the network resources, identify a change in a result of the second assessment for at least one network resource, update the composite risk score for the at least one network resource, and performing an additional security response based on the updated composite risk score of the at least one network resource.

A potential use case of the disclosed embodiments is described below. It is understood that this exemplary use case is provided by way of example only and is not limiting of the present disclosure.

One potential implementation may be to address the least-privilege security problem of a database containing highly sensitive information. A user may use a computing device (e.g., a laptop computer) to access the database hosted in a cloud computing network. The computing device, database, and cloud computing network may also be in communication with a security server that manages secure access to the database. Using the laptop computer, the user may request access to the database. In response, the security server may request that the user be authenticated using some type of identifier, such as a user account and password or biometric authentication. If user's credentials are valid, the security server may authorize access to the user. The user's account may have a number of different permissions associated with it. For example, the user may be able to read the information contained on the database. Users with administrative accounts may have more permissions, such as the ability to delete information from the database, or create new authorized users.

In order to increase security and limit its potential attack surface, the system may run a least-privilege damage check on the system, calculate one or more least-privilege damage scores, and act accordingly based upon the resulting scores. This may occur automatically before the identity is permitted to access the database, periodically, or otherwise. The system may identify all of the relevant permissions associated with the identity. The system may then choose a specific permission and identify if it is used by the corresponding user's identity. If unused, the system may then identify a number of attributes for that permission, for example, the type of permission, the permission's self-frequency, and the permission's general frequency. The system may then calculate a least-privilege damage score based upon the permission's type attributes. For example, if the unused permission selected is a "delete" permission, the identity has never used a delete or similar permission, and delete permissions are rarely used by any other identities associated with the database, the permission type score may be relatively high, indicating that the permission is high risk.

The system may also identify attributes of the database (the target resource) and calculate a score based on those attributes. For example, the system may identify that the resource is for data storage, is specifically a database, and contains sensitive information. The system may also identify that the resource is relatively small because the identity credentials relate to only a single database. Accordingly, the system may create a weighted score related to the target resource.

The system may further create a third least-privilege damage score relating to other special risk factors, such as the risk of shadow admins, the specific permission's frequency in attacks, whether the target resource is identified as especially sensitive, and the security status of the resource. This score may be particularly high for the database in this example because it could be identified as an especially sensitive resource because it contains sensitive or secret information.

The system may then calculate the permission's overall least-privilege damage score by combing the permission's type score, the target resources score, and the special risk factors score. The system may repeat this process for each of the unused permissions associated with the identity. Then the system may compare the scores of each permission and identify the most at risk unused permission. The system may then address the problem by revoking the highest risk permission first. In this example, an unused delete permission associated with the user's identity may be revoked if the user has never used it because the delete permission may present a high risk to the system if access is obtained by a malicious user that wishes to destroy important data stored on the database.

In scenarios where there are multiple secure resources, such as multiple identities, the system may create an aggregate entity least-privilege damage score for each identity. The entity least-privilege damage score may be calculated by aggregating the scores of the permissions associated with the particular entity (e.g., each identity). Comparing the entity least-privilege damage scores for each identity may permit the system to determine which identity is the highest risk, and thus should be addressed first. After determining the highest risk identity, the system may then compare the scores for the permissions associated with the identity to determine which permissions of the identity should be addressed first.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for developing composite risk scores for network resources, the operations comprising:
   retrieving data associated with multiple network resources;
   using the retrieved data to perform a first assessment for each of the multiple network resources to estimate a vulnerability level for each of the multiple network resources;
   developing a result of the first assessment of each of the multiple network resources by accounting for one or more weights associated with factors of the first assessment;
   using the retrieved data to perform a second assessment for each of the multiple network resources to estimate an importance level for each of the multiple network resources;
   developing a result of the second assessment of each of the multiple network resources by accounting for one or more weights associated with factors of the second assessment;
   based on the result of the first assessment and the result of the second assessment, determining a composite risk score for each of the multiple network resources; and performing a security response based on the determined composite risk score of a specific network resource among the multiple network resources.

2. The non-transitory computer readable medium of claim 1, wherein the operations further include normalizing the composite risk score for each of the multiple network resources to quantify an extent of threat associated with each of the multiple network resources.

3. The non-transitory computer readable medium of claim 2, wherein the operations further include identifying, based on the normalized composite risk score, which of the multiple network resources has the highest risk score.

4. The non-transitory computer readable medium of claim 1, wherein the operations further include:
determining the composite risk score for all network resources in a network environment; and
developing an environment-wide result of the composite risk score for all network resources in the network environment.

5. The non-transitory computer readable medium of claim 1, wherein developing the result of the first assessment includes determining which identities have permissions to access a corresponding network resource.

6. The non-transitory computer readable medium of claim 1, wherein developing the result of the second assessment includes determining whether a corresponding network resource has been used within a threshold amount of time.

7. The non-transitory computer readable medium of claim 1, wherein the security response includes determining a least-privilege permission for the specific network resource.

8. The non-transitory computer readable medium of claim 7, wherein the determined least-privilege permission for the specific network resource includes at least one of: a read permission, a write permission, a delete permission, or a create permission.

9. The non-transitory computer readable medium of claim 7, wherein the operations further include applying the determined least-privilege permission for the specific network resource after determining that the specific network resource is associated with a result of the first assessment greater than a first threshold and a result of the second assessment greater than a second threshold.

10. A computer-implemented method for developing composite risk scores for network resources, the method comprising:
retrieving data associated with multiple network resources;
using the retrieved data to perform a first assessment for each of the multiple network resources to estimate a vulnerability level for each of the multiple network resources;
developing a result of the first assessment of each of the multiple network resources by accounting for one or more weights associated with factors of the first assessment;
using the retrieved data to perform a second assessment for each of the multiple network resources to estimate an importance level for each of the multiple network resources;
developing a result of the second assessment of each of the multiple network resources by accounting for one or more weights associated with factors of the second assessment;
based on the result of the first assessment and the result of the second assessment, determining a composite risk score for each of the multiple network resources; and
performing a security response based on the determined composite risk score of a specific network resource among the multiple network resources.

11. The computer-implemented method of claim 10, wherein the data associated with the multiple network resources is retrieved from multiple sources.

12. The computer-implemented method of claim 10, wherein the data associated with the multiple network resources includes at least one: activity data of the multiple network resources, users' data, cost data of the network resources, creation and modification data, sensitivity information, permissions data, security properties data, types of the multiple network resources, size data, or metadata associated with the multiple network resources.

13. The computer-implemented method of claim 10, wherein developing the result of the first assessment is based on at least three of the following factors and their associated weights: a permission type associated with a corresponding network resource, a number of permissions associated with a corresponding network resource, an indication of security practices that a corresponding network resource follows; a number of enabled security features for a corresponding network resource, a number of external entities with permissions to access a corresponding network resource, a number of external entities with permissions to modify a corresponding network resource, a percentage of full network administrators from all users in a network environment with permission to access a corresponding network resource, security statuses of network administrators associated with a corresponding network resource, or an indication whether a corresponding network resource is encrypted.

14. The computer-implemented method of claim 10, wherein developing the result of the second assessment is based on at least three of the following factors and their associated weights: an indication of whether a corresponding network resource includes sensitive data, an indication of when a corresponding network resource was last accessed, an indication of when a corresponding network resource was last updated, a size of a corresponding network resource, a predefined classification of sensitivity associated with a type of a corresponding network resource, an indication whether a corresponding network resource is public or private, costs associated with a corresponding network resource, an identity that created a corresponding network resource, or a number of copies of a corresponding network resource.

15. The computer-implemented method of claim 10, wherein the first assessment is based on at least one of the following factors:
a permission type associated with a corresponding network resource,
a number of permissions associated with a corresponding network resource, or
an indication of security practices that a corresponding network resource follows.

16. The computer-implemented method of claim 10, wherein the first assessment is based on at least one of the following factors:
a number of enabled security features for a corresponding network resource,
a number of external entities with permissions to access a corresponding network resource, or
a number of external entities with permissions to modify a corresponding network resource.

17. The computer-implemented method of claim 10, wherein the first assessment is based on at least one of the following factors:

a percentage of full network administrators from all users in a network environment with permission to access a corresponding network resource, security statuses of network administrators associated with a corresponding network resource, or an indication whether a corresponding network resource is encrypted.

18. The computer-implemented method of claim 10, wherein the second assessment is based on at least one of the following factors:

an indication of whether a corresponding network resource includes sensitive data, an indication of when a corresponding network resource was last accessed, or an indication of when a corresponding network resource was last updated.

19. The computer-implemented method of claim 10, wherein the second assessment is based on at least one of the following factors:

a size of a corresponding network resource, a predefined classification of sensitivity associated with a type of a corresponding network resource, or an indication whether a corresponding network resource is public or private.

20. The computer-implemented method of claim 10, wherein the second assessment is based on at least one of the following factors:

costs associated with a corresponding network resource, an identity that created a corresponding network resource, or a number of copies of a corresponding network resource.

21. The computer-implemented method of claim 10, further comprising:

performing an additional first assessment of at least some of the network resources;

for at least one network resource, identifying a change in a result of the first assessment;

updating the composite risk score for the at least one network resource; and performing an additional security response based on the updated composite risk score of the at least one network resource.

22. The computer-implemented method of claim 10, further comprising:

performing an additional second assessment of at least some of the network resources;

for at least one network resource, identifying a change in a result of the second assessment;

updating the composite risk score for the at least one network resource; and performing an additional security response based on the updated composite risk score of the at least one network resource.

23. The computer-implemented method of claim 10, wherein the security response includes at least one of:

classifying the specific network resource, providing an alert that identifies the specific network resource when a risk score of the network resource is greater than a threshold, generating an output identifying a risk score of the specific network resource, modifying at least one permission associated with the specific network resource, or identifying the specific network resource as a candidate for a privilege reduction operation.

24. The computer-implemented method of claim 10, wherein at least some of the one or more weights associated with factors of the first assessment and the one or more weights associated with factors of the second assessment are dynamically adjusted by a machine learning algorithm.

* * * * *